United States Patent
Pope et al.

(10) Patent No.: US 6,972,114 B2
(45) Date of Patent: Dec. 6, 2005

(54) BIOMASS GASIFIER APPARATUS AND METHOD

(76) Inventors: LeRoy B. Pope, 1505 Plaza Dr., Post Falls, ID (US) 83854; Michael L. Murphy, 2880 Packsaddle Dr., Coeur d'Alene, ID (US) 83815

( * ) Notice: Subject to any disclaimer, the term of this patent is extended or adjusted under 35 U.S.C. 154(b) by 778 days.

(21) Appl. No.: 09/784,261

(22) Filed: Feb. 16, 2001

(65) Prior Publication Data

US 2002/0112403 A1    Aug. 22, 2002

(51) Int. Cl.$^7$ .................................................. C10L 5/00
(52) U.S. Cl. ...................... 422/139; 48/127.3; 422/164
(58) Field of Search ............................ 422/164, 184.1, 422/187; 48/127.3, 203, 197

(56) References Cited

U.S. PATENT DOCUMENTS

| | | | |
|---|---|---|---|
| 4,364,745 A * | 12/1982 | Weil | 48/209 |
| 4,498,909 A * | 2/1985 | Milner et al. | 48/209 |
| 4,592,762 A * | 6/1986 | Babu et al. | 48/197 R |
| 4,848,249 A * | 7/1989 | LePori et al. | 110/234 |
| 5,711,771 A * | 1/1998 | Brown | 48/197 R |
| 6,676,716 B2 * | 1/2004 | Fujimura et al. | 48/197 FM |
| 6,808,543 B2 * | 10/2004 | Paisley | 48/197 R |
| 6,830,597 B1 * | 12/2004 | Green | 48/209 |

* cited by examiner

Primary Examiner—Jonathan Johnson
(74) Attorney, Agent, or Firm—LeRoy B. Pope; Michael L. Murphy

(57) ABSTRACT

A biomass gasifier apparatus (10) produces low BTU gas from biomass, while removing the char and ash in an efficient manner. A fluidized bed gasifier cell (20) receives biomass fuel from a fuel input system (280). A preferred fluidized bed gasifier cell includes a vertically oriented cylindrical enclosure. A layer of bed material (40), typically having a consistency similar to sand, is carried at the base of the enclosure. A plenum (60) supplies hot compressed gas to a plurality of parallel manifolds (80), each of which support a number of nozzles (100). Gas released by the nozzles fluidizes the bed, catalyzing the process of gasification of the biomass, while a low oxygen environment prevents excessive combustion. A bed change-out system (120) removes waste introduced into the fluidized bed gasifier with the biomass. Gas discharged from an upper portion of the fluidized bed gasifier includes low BTU gas that is the desired output of the system. In a preferred application, this gas is injected into a cyclone (140). An upper portion of the cyclone discharges low BTU gas at high-temperature, for use in a boiler or other application, often along with a fossil fuel.

14 Claims, 9 Drawing Sheets

BIOMASS GASIFIER APPARATUS AND METHOD

CROSS-REFERENCES

There are no applications related to this application filed in this or any foreign country.

BACKGROUND

A large number of natural gas, oil and coal fueled energy plants generate electrical and other types of energy for consumer, commercial and industrial applications. The fuel used to operate these facilities contributes to the accumulation of pollutants, including greenhouse gasses, in the atmosphere, and consequently, to global warming.

The combustion of biomass material also results in the release of greenhouse gasses. However, these gasses would have been released over time, as the biomass decomposed in a natural manner. For example, plants, insects and funguses tend to digest and thereby oxidize wood over time. As a result, the release of greenhouse gasses from biomass sources only moves carbon already in the carbon cycle from one point in that cycle to another. In contrast, oil, gas and coal bring carbon that has been out of the carbon cycle for millions of years back into that cycle.

This action, i.e. the return to the carbon cycle of carbon removed from that cycle over millions of years ago, is what is generally blamed for the increase in carbon-based greenhouse gasses. As a result, there is considerable political, economic and social pressure to limit the return of such carbon-based fuels to the carbon cycle.

In part due to that pressure, it is known to supplement the fuel of energy plants, such as coal-fired power plants, with biomass material such as forest and agricultural waste. In such an application, biomass material is oxidized along with the primary fuel source. This approach is best implemented where the biomass is limited to 5%, or at most 20%, of the total fuel.

The combustion of biomass tends to result in some inefficiency, which reduces output and increase the costs of operation. The inefficiencies result primarily from differences between the characteristics of biomass fuel and pulverized coal or other primary fuel. Such differences prevent the use of burners fine-tuned to the combustion of a homogeneous fuel, and require a less efficient but more generalized burner.

What is needed is a biomass gasifier apparatus and method of operation that can be operated in conjunction with an existing fuel-burning facility, or in a stand-alone application. The biomass gasifier apparatus must result in the economic, energy-efficient and environmentally friendly conversion of biomass material into low BTU gas and non-harmful ash minerals.

SUMMARY

The present invention is directed to an apparatus that satisfies the above needs. A novel biomass gasifier apparatus and method of operation is disclosed that produces low BTU gas for use alone or in conjunction with a primary fuel source.

A preferred version of the biomass gasifier apparatus and method of the present invention provides some or all of the following structures and operational steps.
(A) A fuel input system delivers biomass particles of less than 4 inches to a fluidized bed gasifier cell.
(B) The fluidized bed gasifier cell 20 is typically cylindrical, with the axis oriented vertically. A preferred construction includes a ¼-inch thick carbon steel outer cylindrical shell, a 5-inch thick inner layer of refractory and a middle layer of 3–5 inches of insulation. Penetrations are defined through the cylindrical body for view ports, access ports, temperature and pressure probes, bed reinjection and fuel infeed. A preferred fluidized bed gasifier cell includes some or all of the following.
  (a) Bed material 40 is contained at the base of the fluidized bed gasified cell. In a preferred embodiment, the bed material is a sand-like particulate material, and may include fired refractory clay sized for the application. The material should be selected to resist thermal shock and abrasion. In operation, the particulates comprising the bed material are moved in a swirling manner by the gas released from the nozzles, as seen below. Due to the motion of the bed material, the bed is considered to be "fluidized." In the very harsh fluidized environment, involving abrasion between the bed material and fuel, reactive surface area on the fuel is exposed, and heat is moved by conduction and convection to these areas. As a result, the swirling bed material results in faster and more complete decomposition of the biomass.
  (b) A fluidizing gas plenum 60 is located at the base of the fluidized bed gasifier cell 20. The fluidizing gas plenum carries pressurized gas that is delivered to a plurality of manifolds 80.
  (c) The plurality of manifolds 80 are elongated tubes arranged in parallel at the base of the fluidized bed gasifier cell, within the lower portion carrying the bed material. The space between the manifolds is sufficient to allow any tramp material, such as rocks, metal and other inert waste material to pass downwardly.
  (d) A plurality of nozzles 100 is supported by each manifold. The nozzles release gas under pressure, which fluidizes the bed material.
(C) A bed change-out system removes the tramp, clinkers and other waste from the bed material, and returns the bed material for reuse.
(D) A high-temperature gas cleanup device, such as a cyclone 140, receives a mixture of gases, char and ash from an upper portion of the fluidized bed gasifier cell. The cyclone separates this material into first and second outputs. The first output of the cyclone includes a mixture of low BTU gas, a small quantity of gases including oxygen, nitrogen and carbon dioxide and a small quantity of ash. Significantly, all of the energy put into the system is contained in this output in the form of chemical energy and thermal energy contained in the gases. The second output includes a quantity of ash and char.
(E) A char combustion cell 180 receives the second output from the cyclone, including the mixture of char and ash. The char combustion cell oxidizes the char at temperatures of approximately 1700 degrees F., and exhausts the ash. In a preferred embodiment, the char combustion cell includes a fluidized bed, having a plenum, manifolds, nozzles and bed material.
(F) A heat exchanger 220 removes heat energy from the gas leaving the char combustion cell 180. The heat energy is transferred to the gas exhausted by the fluid bed gasifier supply fan 260, which includes the output gas from the gas cleanup unit 240 mixed with ambient air or selected gases.
(G) A gas cleanup unit 240 receives gases discharged from the char combustion cell that have been cooled to about 450 degrees F. after passing through the heat exchanger. The gas cleanup unit may include a multi-cyclone or bag-house design, but must be able to withstand the temperatures to which it will be subjected. Approximately 95% of the ash remaining is removed by the high-temperature gas cleanup device.

(H) A fluid bed gasifier fan 260 receives gas from the gas cleanup unit and additional gas or ambient air and forces the gas at pressure through the heat exchanger 220 where it is elevated in temperature to approximately 750 degrees F. and into the fluidizing gas plenum 60 carried within the fluidized bed gasifier cell 20.

It is therefore a primary advantage of the present invention to provide a novel biomass gasifier system that allows biomass to be used in a supplemental manner with existing coal or other fossil fuel burning systems in a manner that does not require the direct mixture of the biomass and fossil fuel during combustion, but instead combines the fossil fuel and low BTU gas separated from the biomass.

Another advantage of the present invention is to provide a biomass gasifier system that permits the convenient use of biomass as a fuel source, and which thereby reduces the use of fossil fuels that introduce greenhouse gases into the atmosphere.

Another advantage of the present invention is to provide a biomass gasifier system that conditions the gas released by removing most of the ash and char, so that the ash does not negatively effect the down-stream equipment, and which recovers most of the energy from the ash and char in a char combustion cell.

A still further advantage of the present invention is to provide a biomass gasifier system that converts difficult-to-burn biomass into convenient-to-use low BTU gas, which may easily be used in a large number of applications, including use alongside coal or other fossil fuel in typical power generation facilities.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

DESCRIPTION

Figure 1:
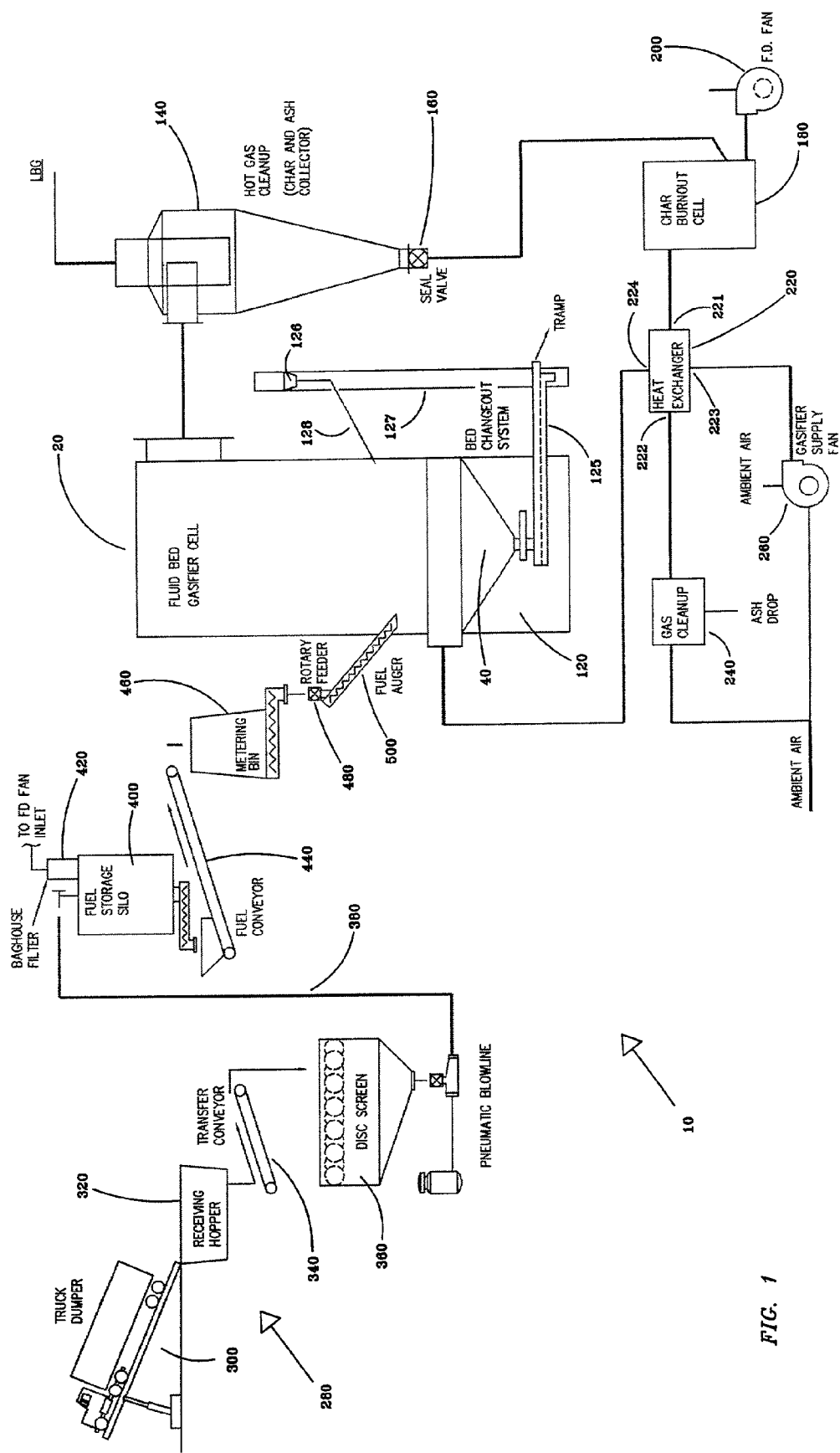
FIG. 1 is a diagrammatic view of a preferred version of the biomass gasifier apparatus, with reference to which the structure and method of operation may be understood.
Figure 2:
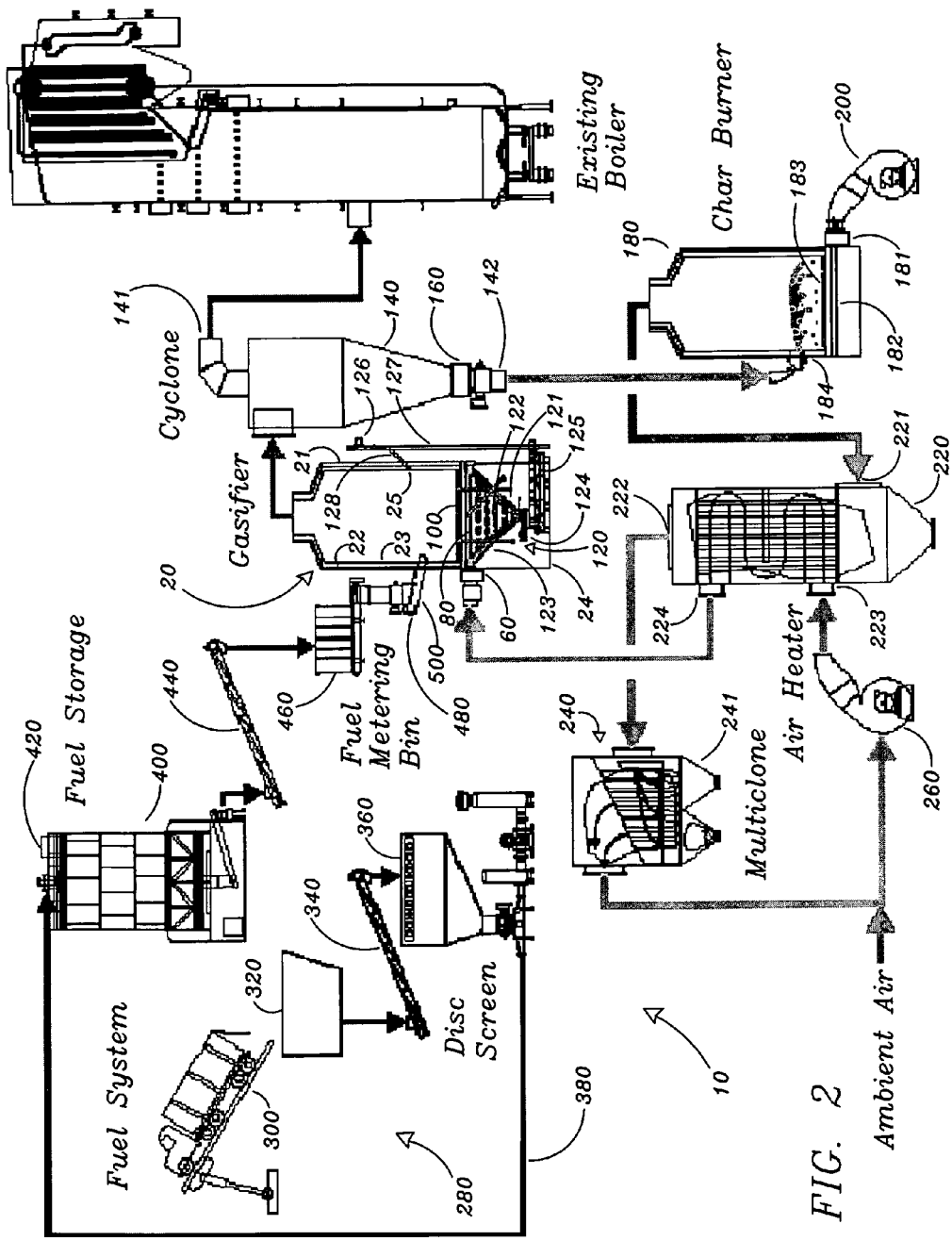
FIG. 2 is a diagrammatic view similar to that of FIG. 1, showing cut-away and cross-sectional views of the various devices.

Referring in generally to FIGS. 1 and 2, a version of a biomass gasifier apparatus 10 constructed in accordance with the principles of the invention and method of operation is seen. A fluidized bed gasifier cell 20 receives biomass fuel from a fuel input system 280. A preferred fluidized bed gasifier cell includes a vertically oriented cylindrical enclosure. A layer of bed material 40, typically having a consistency similar to sand, is carried at the base of the enclosure. A plenum 60 supplies hot compressed gas to a plurality of parallel manifolds 80, each of which support a number of nozzles 100. Gas released by the nozzles fluidizes the bed, catalyzing the process of gasification of the biomass, while a low oxygen environment prevents excessive combustion. A bed change-out system 120 removes waste introduced into the fluidized bed gasifier cell with the biomass. Gas discharged from an upper portion of the fluidized bed gasifier includes low BTU gas, which is the desired output of the system. In a preferred application, this gas is injected into a cyclone 140. An upper portion of the cyclone discharges low BTU gas at high-temperature for use in a boiler or other application, often along with a fossil fuel.

A mixture of char and ash at highly elevated temperature is discharged from the base of the cyclone 140 through a seal such as a double tipping valve 160, or similar structure which prevents reverse flow. The char and ash is transferred to a fluidized bed char combustion cell 180. A force draft fan 200 fluidized the bed of the cell 180 using ambient atmosphere. As a result of the oxygen introduced when the bed of the cell is fluidized and the elevated temperature of the char, the char is completely burned. A mixture of hot gases and some residual ash is then passed through a heat exchanger 220 that transfers heat energy from the gas, typically lowering its temperature substantially. The gas and ash mixture is then transferred to a gas cleanup unit 240, which uses a multi-clone, electrostatic precipitator, bag-house or similar design to remove all but traces of the ash. The gas leaving the gas cleanup unit and a quantity of ambient air or selected gases are driven by a fluid bed gasifier supply fan 260 through the heat exchanger 220, where the temperature of the gas mixture is elevated. The gas is then delivered to the plenum 60 within the fluidized bed gasifier cell 20, allowing the cycle to repeat.

The fuel input system 280 can include a variety of structures; however, a preferred fuel input system includes a dumping station 300 that allows biomass to be delivered by truck to a receiving hopper 320. A transfer conveyor 340 moves the biomass into a separator 360, which allows passage of biomass pieces less than 4" in size. These biomass pieces are transferred by a pneumatic blowline 380 to a fuel storage silo 400. A baghouse filter 420 on the fuel storage silo cleans the air within the silo. A fuel conveyor 440 transfers biomass to a metering bin 460, from which a rotary feeder 480 delivers biomass to a fuel auger 500 for insertion into the fluidized bed gasifier cell.

Referring to FIGS. 1 and 2, a principle version of a biomass gasifier apparatus 10 constructed in accordance is seen. A fluidized bed gasifier cell 20 receives biomass fuel from a fuel input system 280. A preferred fluidized bed gasifier cell includes a vertically oriented enclosure having a layer of bed material 40 at the base of the enclosure. Preheated, compressed gas is released by a plurality of nozzles 100, which in turn may be supplied by an array of manifolds 80 and a plenum 60. Gas released by the nozzles fluidizes the bed, catalyzing the process of gasification of the biomass, while a low oxygen environment prevents excessive combustion. Gas discharged from an upper portion of the fluidized bed gasifier includes low BTU gas that is the desired output of the system.

Referring again to the preferred version of FIGS. 1 and 2, a fuel input system 280 delivers biomass to the fluidized portion of the bed. As seen in the preferred embodiment of FIG. 1, a fuel auger 500 moves biomass pieces having a preferred maximum dimension of 4 inches into the fluidized bed gasifier cell 20.

A preferred fuel input system includes a truck unloader or dumping station 300, which transfers biomass from a truck to a receiving hopper 320. A transfer conveyor 340 moves the biomass to a separator 360, which may include a disk screen or similar apparatus for excluding over-sized chunks. A pneumatic blowline 380 or similar conveyor transfers the biomass to a fuel storage silo 400. A baghouse filter 420 removes fine particulate matter that becomes air-borne. A fuel conveyor 440 transfers the biomass from the fuel storage to a metering bin 460. A rotary feeder 480 and fuel auger 500 inject the biomass into the gasifier cell 20.

Figure 3A:
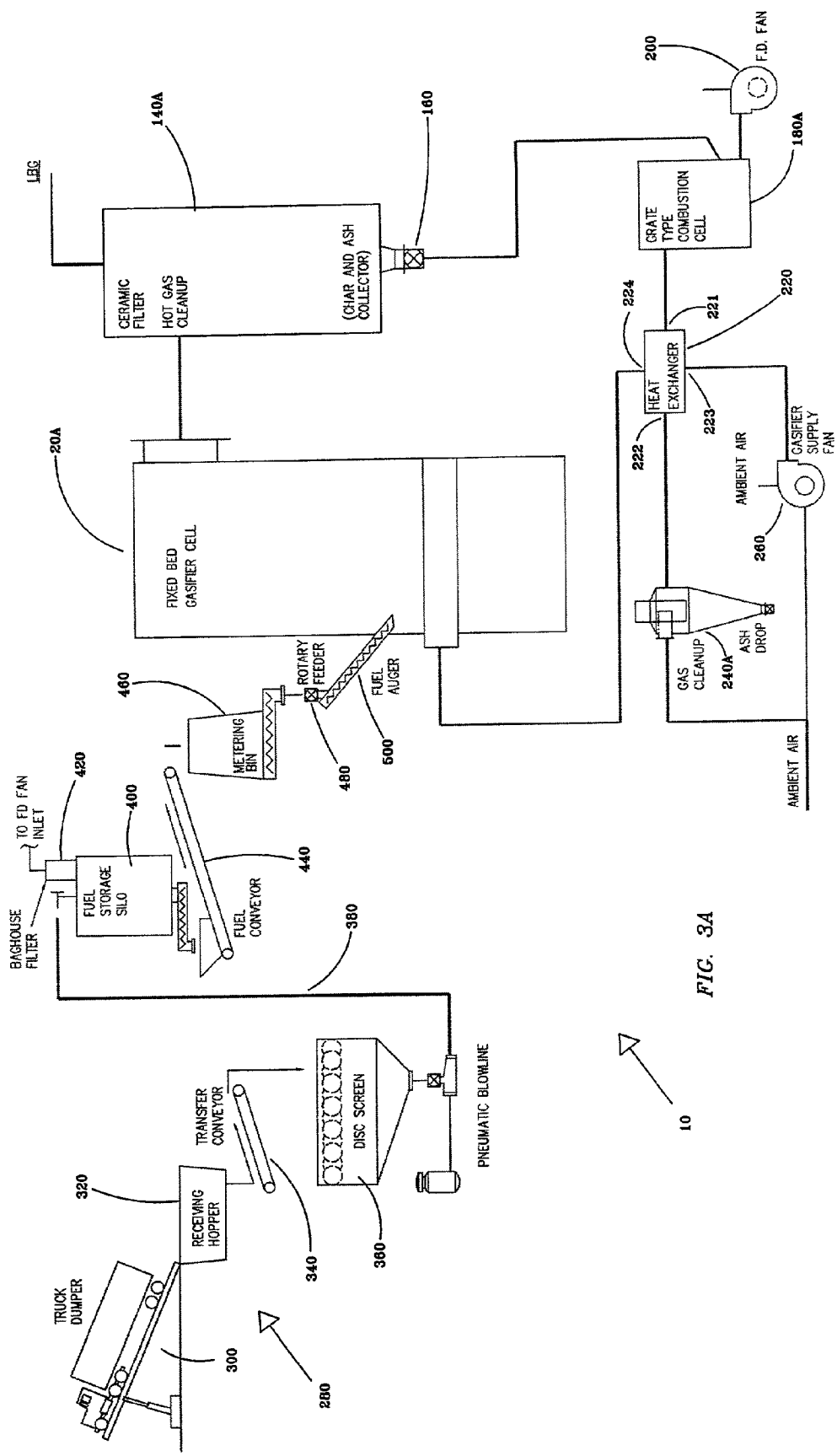
FIG. 3A is a view of a second version of the invention, having a fixed bed type gasifier cell delivering low BTU gas to a ceramic filter type a high-temperature gas cleanup device. A grate type combustion cell receives char from the ceramic filter, and a cyclone type gas clean up unit receives gas from the heat exchanger.
Figure 3B:
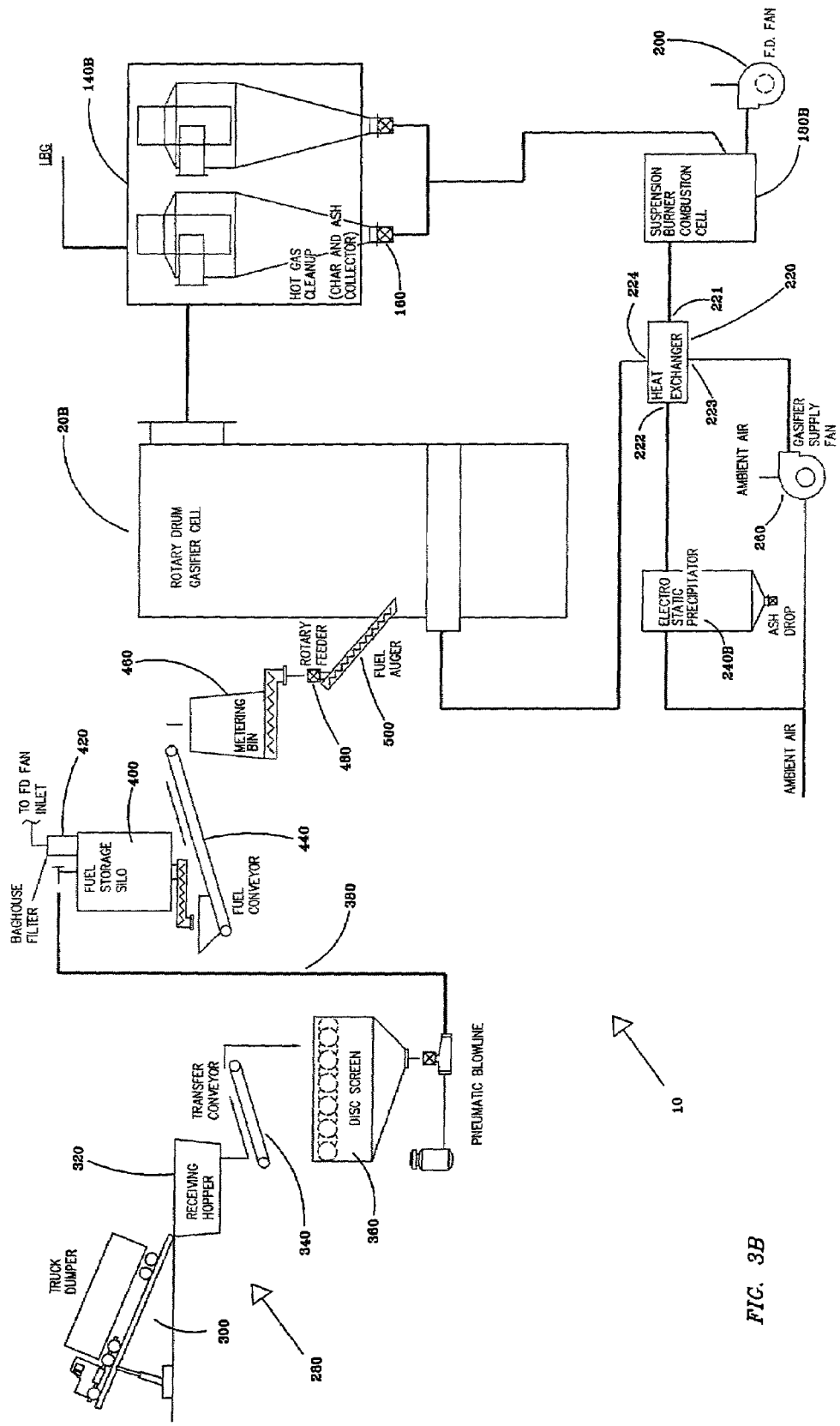
FIG. 3B is a view of a third version of the invention, having a rotary drum type gasifier cell delivering low BTU gas to a multi-clone type a high-temperature gas cleanup device. A suspension burner type char combustion cell receives char from the multi-clone, and an electrostatic precipitator type gas clean-up unit receives gas from the heat exchanger.

As seen in FIGS. 1 and 2, a gasifier cell 20 in a preferred embodiment is typically a fluidized bed. Alternatively, as seen in FIG. 3A, a fixed bed gasifer cell 20A, or as seen in FIG. 3B, a rotary drum gasifier cell 20B may be substituted.

As seen in the drawings, a typical fluidized bed gasifer cell is cylindrical, with the axis oriented vertically. The unit is sized according to the energy output requirements. A principle purpose of the gasifier cell is to receive fuel from the input system 280 and to output low BTU gas at an elevated temperature. The low BTU gas may be used to power a boiler or other apparatus, and may also be used along with a fossil fuel in many applications for which the fossil fuel was previously used alone. The fluidized bed gasifier cell may be used alone, or in conjunction with a cyclone, a char combustion cell and other devices, as will be seen.

In a preferred construction the cell 20 includes inner, middle and outer layers having distinct characteristics. Some deviation may be made, as needed for a given application. In most installations, the gasification cell should be designed to withstand internal pressures of a +/−35-inch water column to meet Nation Fire Protection Agency (NFPA) regulations. The bottom support structure 24, upon which the cell is built, should conform to the Uniform Building Code (UBC) seismic zone and wind conditions.

Referring to FIG. 2, an outer layer 21, includes a ¼-inch thick carbon steel outer cylindrical shell for structural strength.

An inner layer 23 is designed to withstand an environment that is both very hot and very abrasive. The temperature level to which the inner layer must be suited to withstand typically ranges between 1000 and 2000 degrees F. The abrasion is a result of continuous collisions with elements of swirling sand-like bed material 40 during operation. In a preferred application, 5 inches of refractory is used to form the inner layer.

A middle layer 22, carried between the outer carbon steel shell and the inner layer of refractory, includes 3 to 5 inches of insulation. The insulation tends to protect the outer layer from overheating by slowing the heat transfer rate. This additionally increases efficiency by decreasing heat loss, resulting in a higher temperature for the low BTU gas output.

A number of penetrations 25 are defined through the three layers of the cylindrical body. The penetrations provide for view ports, access ports, the insertion of temperature and pressure probes, fuel infeed and gas removal.

Bed material 40 is carried at the base of the fluidized bed gasified cell. In a preferred embodiment, the bed material is a sand-like particulate material, and may include fired refractory clay sized for the application. The material should be selected to resist thermal shock and abrasion.

In operation, the particulates comprising the bed material are moved in a swirling manner by the gas released from the nozzles, as seen below. Due to the motion of the bed material, the bed is considered to be "fluidized." In the very harsh fluidized environment, involving abrasion between the bed material and fuel, reactive surface area on the fuel is exposed, and heat is moved by conduction and convention to these areas. As a result, the swirling bed material results in faster and more complete decomposition of the biomass into low BTU gas, ash and char.

As seen in FIG. 2, a plenum 60 contains a reservoir of heated gas at elevated pressure. The plenum is carried at the base of the fluidized bed gasifier cell 20. The fluidizing gas plenum 60 receives heated gas from the second output 224 of the heat exchanger 220. The plenum delivers heated gas to the plurality of manifolds at the base of the fluidized bed gasifier cell 20.

A plurality of manifolds 80 is carried at the base of the fluidized bed gasifier cell 20. In a preferred embodiment, the manifolds are elongated tubes arrayed in parallel at the base of the fluidized bed gasifier cell. Each manifold is in communication with the plenum 60. In operation, heated gas under pressure is transferred from the plenum to the manifolds.

The elevation of the manifolds is such that prior to operation they are surrounded, both above and below, by the bed material 40. The space between the manifolds is sufficient to allow any tramp material, such as rocks, metal and other inert waste material to pass downwardly between adjacent manifolds.

A plurality of nozzles 100 is supported at regular intervals by each manifold. Each nozzle is surrounded by bed material prior to operation. During operation, the nozzles release heated gas under pressure, which is delivered from the plenum. The quantity and pressure of the gas released by the nozzles fluidizes the bed material above the level of the discharge orifices of each nozzle.

The performance of the fluidized bed gasifier cell 20 may be enhanced, and down time reduced, by the addition of a bed change-out system. As seen in FIGS. 1 and 2, a bed change-out system 120, in communication with the fluidized bed gasifier cell 20, removes a mixture of bed material together with impurities including tramp, clinkers and other waste. Such waste material is introduced into the bed through the fuel input system 280 during operation. Removal of the waste is desirable, in part because the ability of the bed to fluidize is dependent upon the bed material having a particle size, weight and hardness that is consistent with the fluidization process. Tramp and other waste particles tend to be of far greater mass, and are therefore inconsistent with the fluidization process. After the waste is removed, the bed material returned to the fluid bed gasifier cell 20.

As seen in FIG. 2, in a preferred application, the fluid bed is carried by an an inner perforated cone 121. A principle purpose of the inner perforated cone is to draw the bed downwardly, i.e. remove bed material, in a manner that causes the surface of the bed to go down uniformly. The perforations 122 allow bed material to pass from the inner cone to the outer draw down cone 123. The perforations are sized and distributed on the inner perforated cone to result in bed material passing through the perforations at a rate that lowers the entire level of the bed in a uniform manner. For example, the center of the bed does not go down more rapidly, causing a dimple or depression in that area.

The inner cone 121 is nested within an outer draw down cone 123, having no perforations. A principle purpose of the outer draw down cone is to catch the bed material and waste passing through the inner perforated cone, and to concentrate and deliver that material to a slide gate 124 controlling passage from the base of the outer draw down cone.

Flow of bed material and waste through the lower opening of the draw down cone 123 is governed by a slide gate 124. When the slide gate is open, bed material 40, together with the waste distributed through out the bed material, is discharged from the slide gate. A preferred slide gate valve is a circular eight-inch horizontal-slide, roller mounted, low-profile unit and is powered by a double acting air cylinder. The open/close action is electrically controlled through a four-way solenoid valve.

The rate at which bed material mixed with waste material is metered through the slide gate depends on a number of variables, such as the quantity of waste found mixed with given quantity of bed material, the size of the waste particles found, and the dissimilarity of the waste particles to the bed material.

A manually operated slide gate isolation valve is located directly above the automatic slide gate and remains open during normal operation. This valve is used to isolate the automatic slide gate valve for maintenance purposes.

The mixture of bed material and waste metered through the slide gate 124 is transferred to a vibrating screen conveyor 125. The vibrating screen incorporates a perforated plate to separate tramp material from the reusable bed material. The screen conveyor discharges the bed material into a bucket 126 and discharges the tramp into a disposal hopper. The bucket is lifted in an elevator shaft 127 and the bed material is transferred to a bed material reinjection piping train 128. The reinjection piping train delivers the bed material into the fluidized bed gasifier cell 20.

A preferred bed material reinjection piping train 128 gravity feeds the bed material elevated within the elevator shaft. The piping train consists of a wye branch bed material reservoir, an isolation slide-gate, a wye eductor, a wye branch cleanout, reinjection piping, and miscellaneous interconnecting piping, fittings and hardware.

In a preferred version of the biomass gasifier 10, the quality of the low BTU gas output from the fluidized bed gasifier cell 20 may be enhanced by the addition of a high-temperature primary gas clean-up device that removes char and ash from the gas. As seen in the preferred versions of the inventions illustrated in FIGS. 1 and 2, a preferred high-temperature primary gas cleanup device includes a cyclone 140. Alternatively, as seen in FIG. 3A, a ceramic filter 140A may be used as the high-temperature primary gas cleanup device. In a further version seen in FIG. 3B, a multi-clone device 140B may be used as the high-temperature primary gas cleanup device. And, in a alternate version of the invention seen in FIG. 3C, a baffle device 140C, (e.g. a device employing baffles shaped as "chevrons") may be used as the high-temperature primary gas cleanup device.

As seen in FIGS. 1 and 2, a cyclone 140 receives a mixture of gases, char and ash from an upper portion of the fluidized bed gasifier cell 20. Because the mixture is taken from an upper portion of the fluidized bed gasifier cell, bed material, tramp and other waste are not present. A principle purpose of the cyclone 140 is to increase the quality of the low BTU gas by removing the char and ash.

The first output 141 of the cyclone exhausts a mixture of low BTU gas, a small quantity of gases including nitrogen and carbon dioxide, a small amount of oxygen, and a small quantity of ash. Significantly, all of the energy put into the system in the form of biomass is contained in this output in the form of the chemical energy and the thermal energy contained in the gases.

A second output 142 of the cyclone exhausts a substantial quantity of the ash present initially in the biomass, as well as the bulk of the char initially present. In most applications, a small quantity of the char initially present in the biomass is oxidized in the fluidized bed gasifier cell 20. However, due to the low oxygen environment within that cell, a substantial quantity of the char is not oxidized.

A double tipping valve 160, rotary feeder, dipleg, screw conveyor or equivalent seal valve structure, prevents gas from exhausting through the second output 142, but allows char and ash to be exhausted. The double tipping valve includes an upper and a lower valve. A space between the valves may be filled with char and ash when the upper valve is opened and the lower valve closed. The upper valve is then closed and the lower valve is opened, thereby releasing the ash and char. Ash and char discharged by the double tipping valve is piped to the fluidized bed char combustion cell 180.

A char combustion cell 180 receives the second output 142 from the cyclone 140, including a mixture of char and ash. A principle purpose of the char combustion cell is to oxidize the char and to exhaust the ash. A preferred char combustion cell is a fluidized bed 180. However, as seen in FIG. 3A, a grate, or pinhole grate, type combustion cell 180A or as seen in FIG. 3B, a suspension burner combustion cell 180B could be substituted.

Referring to FIGS. 1 and 2, the preferred fluidized bed char combustion cell 180 is illustrated. The fluidized bed has a plenum 181 that is pressurized by a char combustion cell force draft fan 200. In a manner similar to the fluidized bed gasified cell 20, the plenum 181 pressurizes at least one manifold 182. Each manifold supports one or more nozzles 183. Gas exhausted from the nozzles fluidizes the fluid bed 184.

In operation, the mixture of char and ash 142 received from the cyclone 140 is injected into the char combustion cell 180. In a preferred embodiment, the temperature of the char delivered to the char combustion cell is typically around 1500 degrees F. However, despite the high temperature, combustion has not taken place because the environments of the gasifier cell 20 and cyclone 140 are maintained at a low oxygen level. The oxygen levels are increased within the fluidized bed 180 by the gas exhausted from the nozzles 183. Within this elevated oxygen environment, the char is oxidized.

An exhaust pipe is connected to an upper portion of the char combustion cell 180, above the fluidized portion of the bed. A mixture comprising primarily nitrogen, oxygen, carbon dioxide and ash is exhausted at high temperature.

A heat exchanger 220 removes heat energy from the gas and ash leaving the char combustion cell 180, prior to the arrival of that gas and ash in the gas cleanup unit 240. The heat energy is transferred to the gas exhausted by the fluid bed gasifier supply fan 260 and the gas cleanup unit 240 prior to transfer to the plenum 60. As a result, the gas cleanup unit and fluid bed gasifier supply fan may be operated at lower temperature.

As seen in FIGS. 1 and 2, the mixture of gas and ash leaving the char combustion cell 180 is at elevated temperature, typically about 1700 degrees F. This gas is introduced to the first input 221 of the heat exchanger. The gas follows a convoluted course through the heat exchanger, and drops in temperature to approximately 450 degrees F. At a much-reduced temperature, typically approximately 450 degrees F., the gas is exhausted through the first output 222.

Continuing to refer to FIGS. 1 and 2, it can be seen that gas exhausted by the gasifier supply fan 260 is introduced to the second input 223. Typically, this gas is at about 450 degrees F. The gas also follows a convoluted course, where its temperature is raised to approximately 750 degrees F. The gas is then exhausted from the second output 224, from where it is piped to the plenum of the gasified cell 20.

Figure 3C:
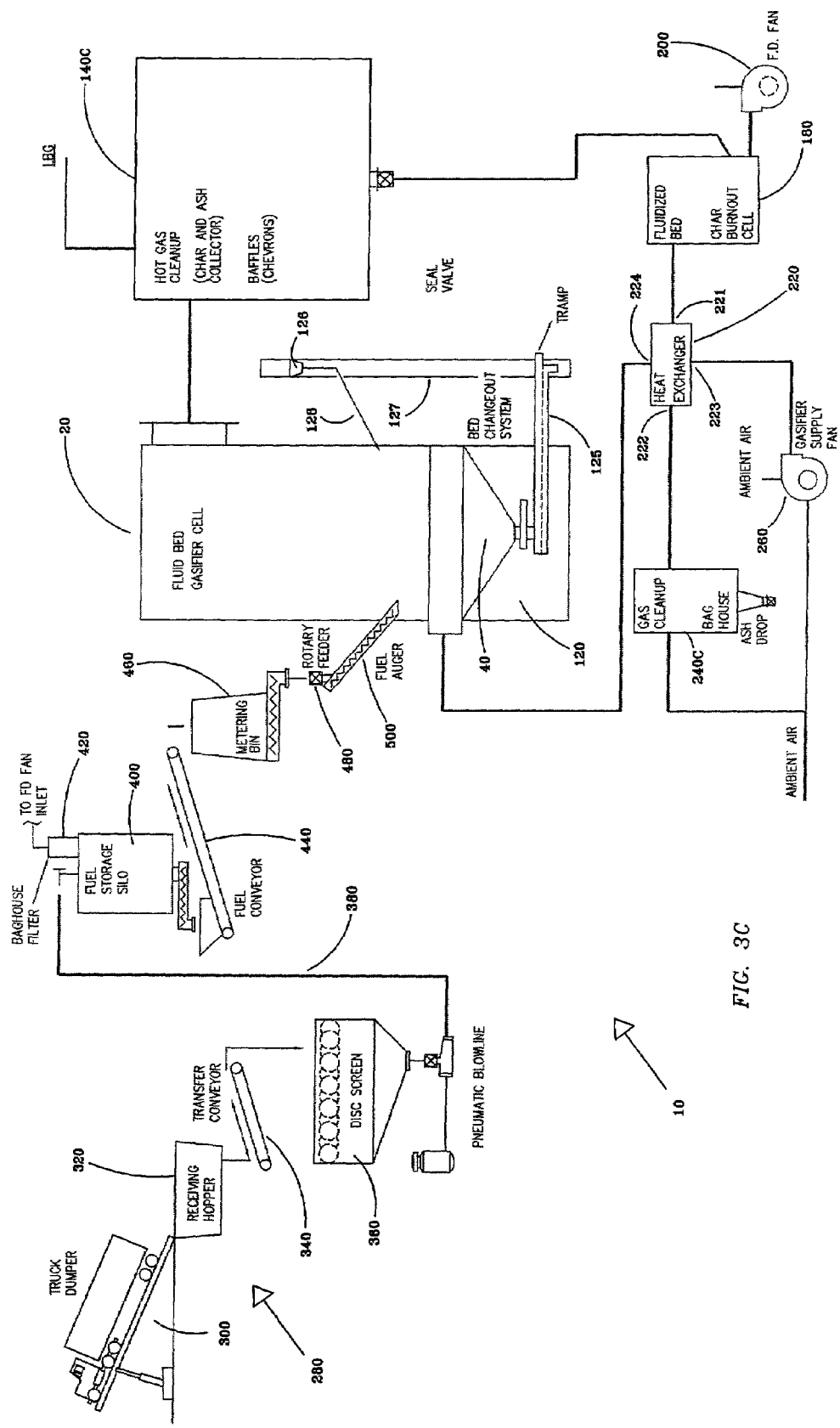
FIG. 3C is a view of a fourth version of the invention, having a fluid bed type gasifier cell delivering low BTU gas to a baffle or chevron type a high-temperature gas clean-up device. A fluidized bed type char burnout cell receives char from the high-temperature gas clean-up device, and a bag-house type gas clean-up device receives gas from the heat exchanger.

A secondary gas cleanup unit 240 receives gases discharged from the char combustion cell 180 that have been cooled to about 450 degrees F. after discharging substantial heat energy in the heat exchanger 220. The secondary gas clean up unit may include a multi-cyclone 240, a cyclone 240A (as seen in FIG. 3A), an electrostatic precipitator 240B (as seen in FIG. 3B), or a bag-house 240C (as seen in FIG. 3C). The design selected must be able to withstand the temperatures to which it will be subjected in the intended design. Depending on the unit selected, approximately 95 to 99% of the ash remaining is removed by the gas cleanup unit.

As seen in FIG. 2, a preferred secondary gas cleanup unit includes a multi-clone 240, having a plurality of cyclones 241. In operation, gas moves thorough the cyclones, while approximately 95% or more of the ash drops out. The ash collected is cooled and discarded in an environmentally sound manner.

A fluid bed gasifier supply fan 260 draws gas from the gas cleanup unit 240 and additional gas or ambient air as input. The mixture of gases is then forced at high pressure into the second input of the heat exchanger where the temperature of the gas is elevated to approximately 750 degrees F. Once heated, the gas leaves the second output of the heat exchanger, and is forced into the fluidizing gas plenum 60 carried within the fluidized bed gasifier cell 20.

Figure 4:
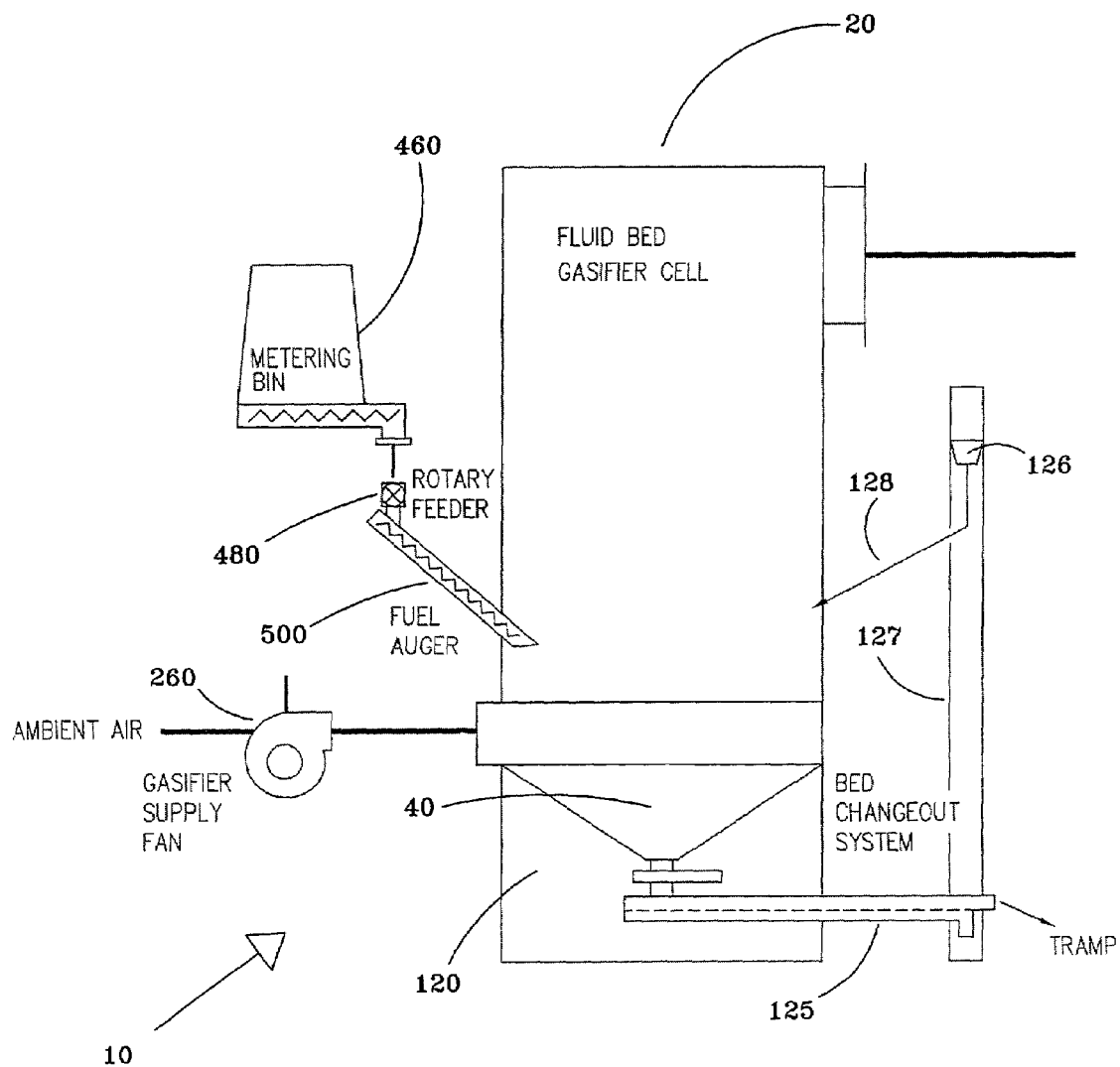
FIG. 4 is a view of a sixth version of the invention, having a fluid bed gasifier cell that inputs biomass and exhausts low BTU gas.

Referring to FIG. 4, a version of the invention is seen that requires only a gasifier cell to produce an output comprising low BTU gas. In a preferred version, the gasifier cell is a fluidized bed 20. Heated gas is exhausted from the nozzles within the fluidized bed, as seen above. The highly abrasive, low-oxygen environment of the fluidized bed results in the gasification of the biomass and the generation of low BTU gas.

Figure 5:
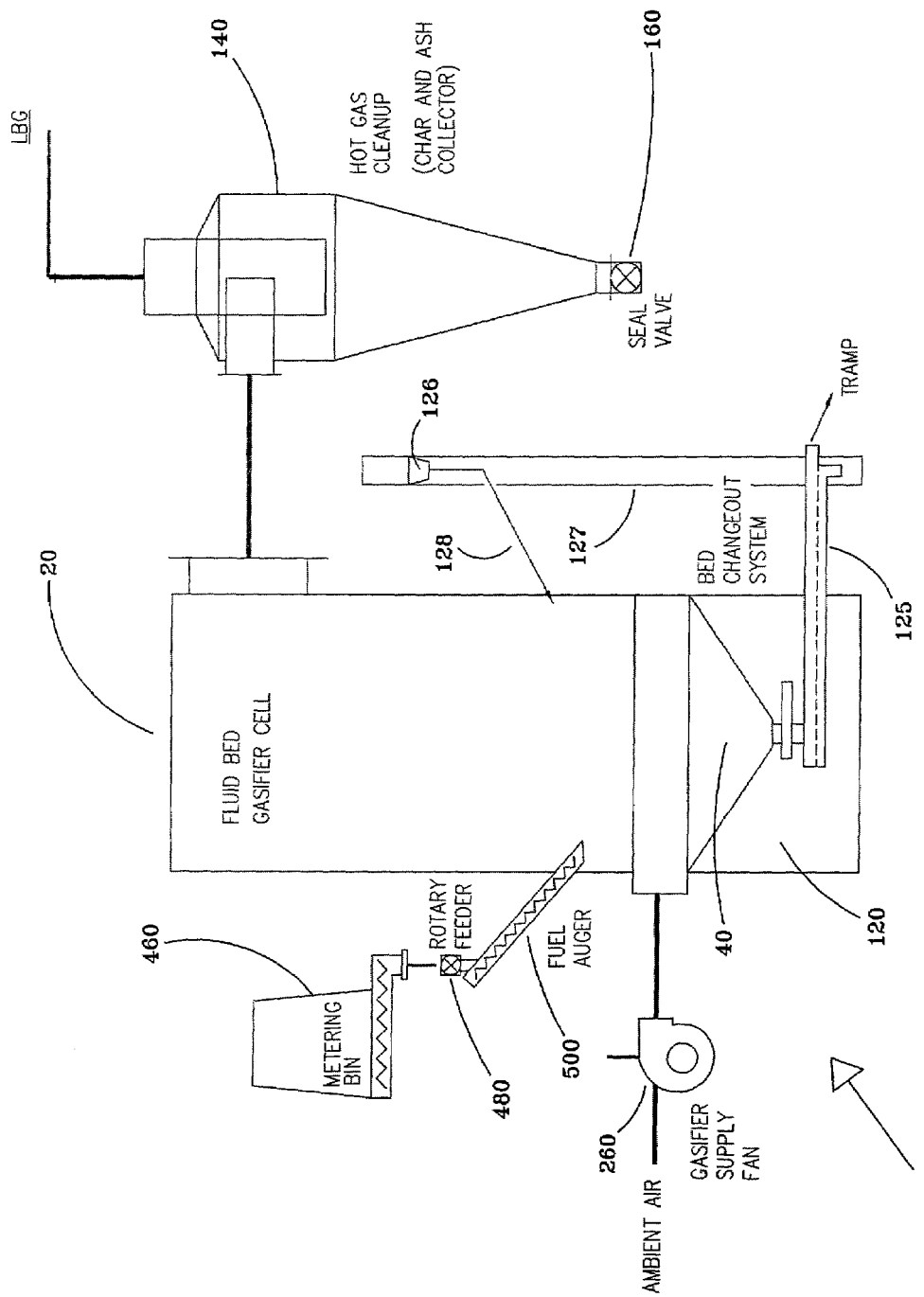
FIG. 5 is a view of a seventh version of the invention, similar to that of FIG. 4, wherein a primary gas cleanup device, such as a cyclone, has been added to increase the quality of the low BTU gas produced.

Referring to FIG. 5, a version of the invention is similar to the version of FIG. 4. A primary gas cleanup device, such as a cyclone 140 is used to increase the quality of the low BTU gas produced by removing char, ash and other impurities. In this version of the invention, the char and ash are simply disposed of after removal by the primary gas cleanup device.

Figure 6:
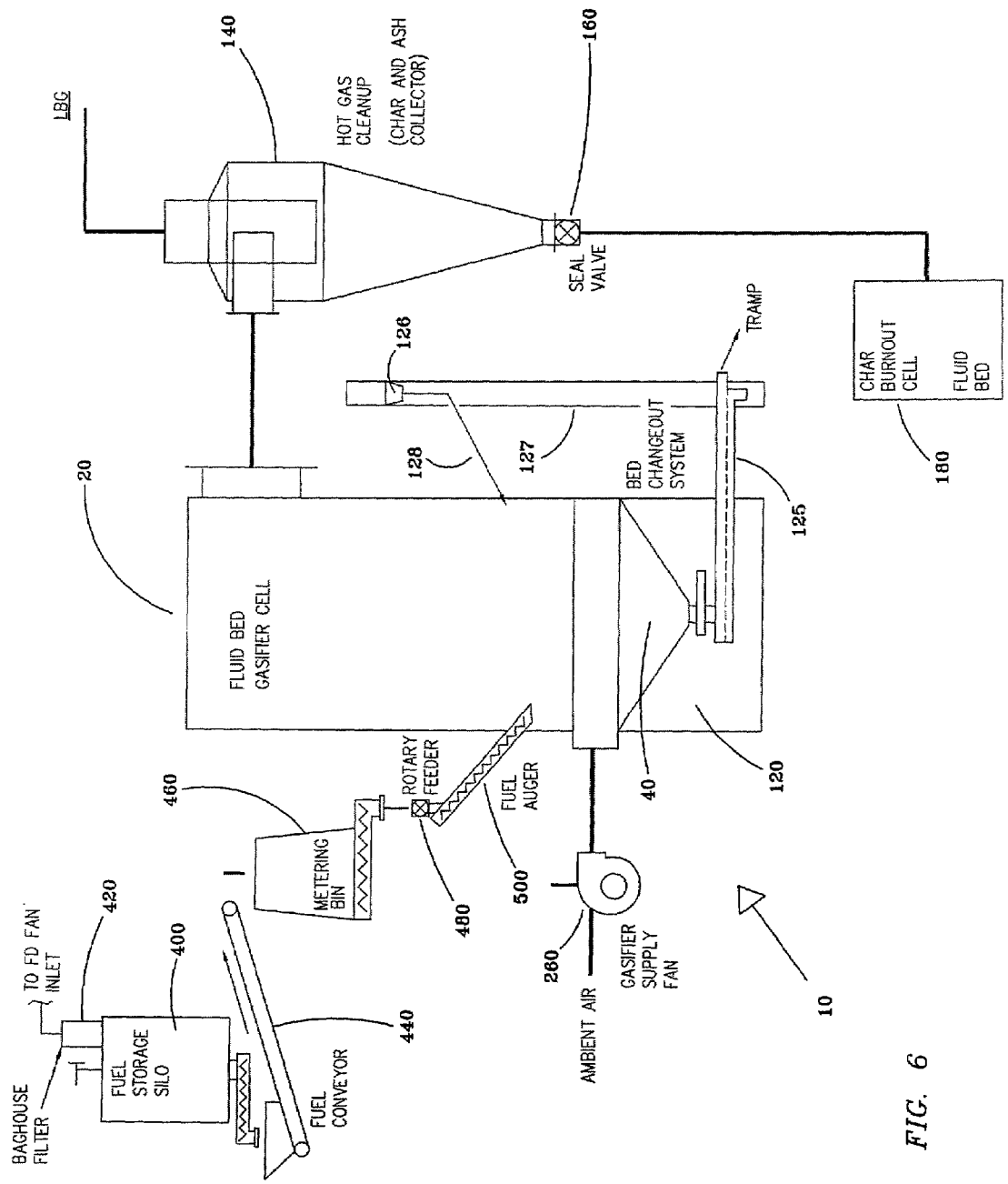
FIG. 6 is a view of an eighth version of the invention, similar to that of FIG. 5, wherein a char combustion cell has been added to oxidize the char separated from the low BTU gas by the primary gas cleanup device.

Referring to FIG. 6, a version of the invention is similar to the version of FIG. 5. A char combustion cell 180 has been added to oxidize the char separated from the low BTU gas by the primary gas cleanup device. As a result of the oxidation, heat energy is extracted from the char prior to disposal.

Figure 7:
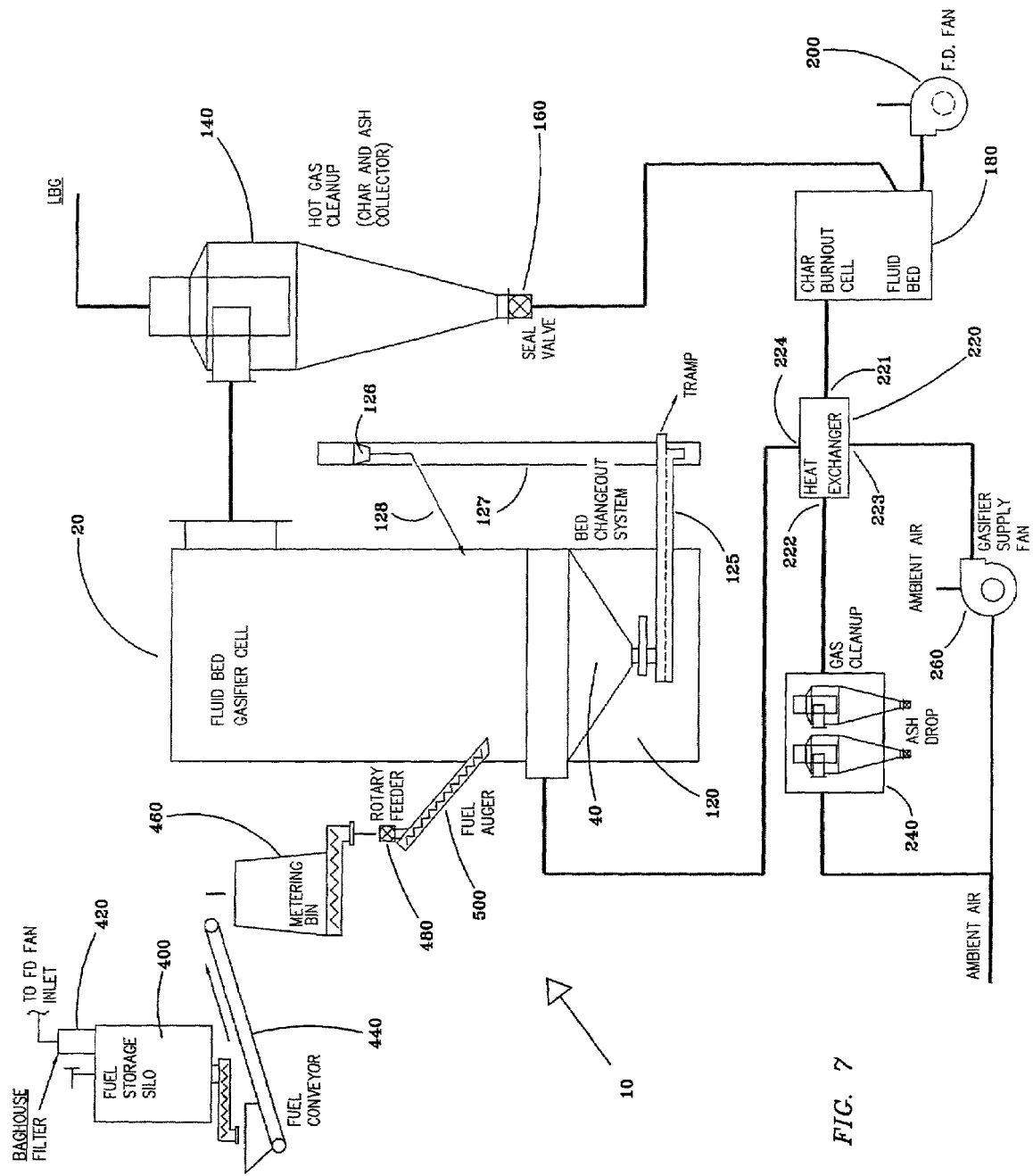
FIG. 7 is a view of a ninth version of the invention, similar to that of FIG. 6, wherein a heat exchanger has been added to remove heat from the exhaust of the char combustion cell. Removal of the heat allows use of a secondary gas cleanup device to increase the quality of the gas exhausted from the char combustion cell, so that it may be used to fluidize the fluid bed gasifier cell.

Referring to FIG. 7, the addition of a heat exchanger allows removal of heat from the gas exhausted by the char combustion cell. Removal of the heat allows use of a somewhat temperature-sensitive secondary gas cleanup device 240 and force draft fan 260. Such a gas cleanup device would increase the quality of the gas exhausted from the char combustion cell, so that the cleaned gas may be used to fluidize the fluid bed gasifier cell.

The previously described versions of the present invention have many advantages, including a primary advantage of providing a novel biomass gasifier system that allows biomass to be used in a supplemental manner with existing coal or other fossil fuel burning systems in a manner that does not require the direct mixture of the biomass and fossil fuel during combustion, but instead combines the fossil fuel with a low BTU gas separated from the biomass.

Another advantage of the present invention is to provide a biomass gasifier system that permits the convenient use of biomass as a fuel source, and which thereby reduces the use of fossil fuels that introduce greenhouse gases into the atmosphere.

Another advantage of the present invention is to provide a biomass gasifier system that conditions the gas released by removing most of the ash and char, so that the ash does not negatively effect the down-stream equipment, and which recovers most of the energy from the ash and char in a char combustion cell.

A still further advantage of the present invention is to provide a biomass gasifier system that converts difficult-to-burn biomass into convenient-to-use low BTU gas, which may easily be used in a large number of applications, including use alongside coal or other fossil fuel in typical power generation facilities.

Although the present invention has been described in considerable detail and with reference to certain preferred versions, other versions are possible. For example, an operational version of the biomass gasified 10 includes only the fluidized bed gasified cell 20, as seen in FIG. 3. However, an improved version of the biomass gasified includes the cyclone 140, which reduces the ash content of the low BTU gas, and therefore increases the quality of that gas. Similarly, the char combustion cell is not required, and the char may be disposed of in an alternative manner. However, some additional heat energy is obtained by oxidizing the char in the char combustion cell. Additional advantage is obtained by using a fluidized bed to oxidize the char. Additionally, the heat exchanger 220 is not required. However, its use allows the operation of the gas cleanup unit 240 and fan 260 at a much lower temperature.

In compliance with the U.S. patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A biomass gasifier apparatus, comprising:
   (A) a fuel input system;
   (B) a fluidized bed gasifier cell, configured to receive fuel from the fuel input system, comprising:
      (a) bed material, carried at a base of the fluidized bed gasified cell;
      (b) a fluidizing gas plenum, carried within the fluidized bed gasifier cell;
      (c) a plurality of manifolds, arranged within the fluidized bed gasifier cell, wherein a space defined between adjacent manifolds is sufficient to allow tramp material to pass downwardly; and
      (d) a plurality of nozzles, supported by each manifold, wherein gas released by the plurality of nozzles fluidizes the bed material; and
   (C) wherein the fluidized bed gasifier cell is configured to receive heated gas, and to exhaust a mixture of gases, char and ash from an upper portion of the gasifier cell.

2. The biomass gasifier apparatus of claim 1, additionally comprising:
   (A) a cyclone, having an input in communication with the fluidized bed gasifier cell, for receiving a mixture of gases, char and ash from an upper portion of the fluidized bed gasifier cell, and for separating the mixture into first and second outputs, comprising a first output exhausting a mixture of low BTU gas, and a second output exhausting gas carrying a mixture of ash and char.

3. The biomass gasifier apparatus of claim 1, additionally comprising:
   (A) a bed change-out system, in communication with the fluidized bed gasifier cell, for removing tramp, clinkers and other waste from the bed material.

4. The biomass gasifier apparatus of claim 1, additionally comprising:
   (A) a cyclone, having an input in communication with the fluidized bed gasifier cell, for receiving a mixture of gases, char and ash from an upper portion of the gasifier cell, and for separating the mixture into first and second outputs, comprising a first output exhausting a mixture of low BTU gas, and a second output exhausting gas carrying a mixture of ash and char.

5. The biomass gasifier apparatus of claim 4, additionally comprising:
   (A) a char combustion cell, having an input connected to the second output of the cyclone, oxidizes the char at elevated temperatures.

6. The biomass gasifier apparatus of claim 5, additionally comprising:
   (A) a heat exchanger, having an input connected to an output of the char combustion cell, to receive gas leaving the char combustion cell and to remove heat energy.

7. The biomass gasifier apparatus of claim 6, additionally comprising:
   (A) a gas cleanup unit, having an input connected to an output of the heat exchanger, to receive gases discharged from the char combustion cell that have been cooled by the heat exchanger, to remove ash from the gas and to exhaust cleaned gas through an output.

8. The biomass gasifier apparatus of claim 7, wherein the secondary gas clean-up system comprises:
   (A) a multi-clone unit.

9. The biomass gasifier apparatus of claim 7, wherein the secondary gas clean-up system comprises:
   (A) a cyclone.

10. The biomass gasifier apparatus of claim 7 wherein the secondary gas clean-up system comprises:
    (A) a ceramic filter.

11. The biomass gasifier apparatus of claim 7, wherein the secondary gas clean-up system comprises:
    (A) a baffle device.

12. The biomass gasifier apparatus of claim 6, additionally comprising:
    (A) a fluid bed gasifier fan, having an input connected to the output of the gas cleanup unit, forces a gas mixture of the cleaned gas from the gas cleanup unit and additional gas at high pressure into a second input of the heat exchanger, wherein the gas mixture is heated, exhausted from a second output of the heat exchanger, and delivered to the fluidizing gas plenum of the fluid bed gasifier cell.

13. A biomass gasifier apparatus, comprising:
    (A) a fuel input system;
    (B) a fluidized bed gasifier cell, configured to receive fuel from the fuel input system, the fluidized bed gasifier cell comprising:
       (a) bed material, carried at a base of the fluidized bed gasified cell;
       (b) a fluidizing gas plenum, carried within the fluidized bed gasifier cell;
       (c) a plurality of manifolds, arranged within the fluidized bed gasifier cell, wherein a space defined between adjacent manifolds is sufficient to allow tramp material to pass downwardly; and
       (d) a plurality of nozzles, supported by each manifold, wherein gas released by the plurality of nozzles fluidizes the bed material; and
    (C) wherein a mixture of gases, char and ash is exhausted from an upper portion of the fluidized bed gasifier cell;
    (D) a cyclone, having an input in communication with the fluidized bed gasifier cell, for receiving a mixture of gases, char and ash from an upper portion of the fluidized bed gasifier cell, and for separating the mixture into first and second outputs, comprising a first output exhausting a mixture of low BTU gas, and a second output exhausting gas carrying a mixture of ash and char; and
    (E) a char combustion cell, having an input connected to the second output of the cyclone, for oxidizing the char at elevated temperatures; and
    (F) wherein gas heated within the char combustion cell is used to fluidize the fluidized bed gasifier cell.

14. A biomass gasifier apparatus, comprising:
    (A) a fuel input system;
    (B) a fluidized bed gasifier cell, configured to receive fuel from the fuel input system, wherein the fluidized bed gasifier cell comprises:
       (a) bed material, carried at the base of the fluidized bed gasified cell;
       (b) a fluidizing gas plenum, carried within the fluidized bed gasifier cell;
       (c) a plurality of manifolds, arranged within the fluidized bed gasifier cell, wherein a space defined between adjacent manifolds is sufficient to allow tramp material to pass downwardly; and (d) a plurality of nozzles are supported by each manifold, wherein gas released by the nozzles fluidizes the bed material; and (C) a bed change-out system, in communication with the fluidized bed gasifier cell, for removing tramp, clinkers and other waste from the bed material;

(D) a cyclone, having an input in communication with the fluidized bed gasifier cell, for receiving a mixture of gases, char and ash from an upper portion of the fluidized bed gasifier cell, and for separating the mixture into first and second outputs, comprising a first output exhausting a mixture of low BTU gas, and a second output exhausting gas carrying a mixture of ash and char;

(E) a char combustion cell, having an input connected to the second output of the cyclone, oxidizes the char at elevated temperatures;

(F) a heat exchanger, having a first input connected to an output of the char combustion cell, receives gas leaving the char combustion cell and removes heat energy;

(G) a gas cleanup unit, having an input connected to a first output of the heat exchanger, receives gases discharged from the char combustion cell that have been cooled by the heat exchanger, and removes ash from the gas and exhausts cleaned gas through an output; and (H) a fluid bed gasifier fan, having an input connected to the output of the gas cleanup unit, forces a gas mixture of the cleaned gas from the gas cleanup unit and additional gas at high pressure into a second input of the heat exchanger, wherein the gas mixture is heated, exhausted from a second output of the heat exchanger, and delivered to the fluidizing gas plenum of the fluid bed gasifier cell.

* * * * *